United States Patent [19]

Heide et al.

[11] 3,899,556

[45] Aug. 12, 1975

[54] PROCESS FOR PRODUCING IMPLANTABLE, POROUS, CERAMIC, BONE SUBSTITUTION, BONE CONNECTION OR PROSTHESIS ANCHORING MATERIALS

[75] Inventors: Helmut Heide, Schwalbach, Taunus; Ulrich Hoffmann, Eschborn-Niederhochstadt; Gunther Brötz, Stierstadt, Taunus; Eva Poeschel, Altenhain, all of Germany

[73] Assignee: German Federal Republic, represented by the Minister for Research and Technology, Bonn, Germany

[22] Filed: Aug. 31, 1973

[21] Appl. No.: 393,487

[30] Foreign Application Priority Data

Aug. 31, 1972 Germany............................ 2242867

[52] U.S. Cl............................. 264/44; 264/DIG. 44
[51] Int. Cl.............................................. B29h 7/20
[58] Field of Search....................... 264/44, DIG. 44

[56] References Cited
UNITED STATES PATENTS

| | | | |
|---|---|---|---|
| 2,996,389 | 8/1961 | Fernhof............................ | 264/44 X |
| 3,090,094 | 5/1963 | Schwartzwalder et al............ | 264/44 |
| 3,097,930 | 7/1963 | Holland............................... | 264/44 |
| 3,176,054 | 3/1965 | Einstein et al........................ | 264/44 |

*Primary Examiner*—Lewis T. Jacobs
*Attorney, Agent, or Firm*—Christen & Sabol

[57] ABSTRACT

A process for producing an implantable, porous, ceramic bone substitution or bone connection or prosthesis anchoring material, and the like, which has open pores of substantially regular or uniform size, distribution and disposition. The process includes (a) producing a frame which corresponds approximately to the pores and pore connections of the desired finished product, (b) filling the frame with a physiologically suitable and biologically compatible castable or pourable ceramic mass, and (c), after at least a partial hardening of the ceramic mass, dismantling or decomposing and removing the frame, whereby said finished raw product or said ceramic material is obtained. The finished product can be used for the permenant or temporary replacement of bone matter.

21 Claims, No Drawings

PROCESS FOR PRODUCING IMPLANTABLE, POROUS, CERAMIC, BONE SUBSTITUTION, BONE CONNECTION OR PROSTHESIS ANCHORING MATERIALS

BACKGROUND OF THE INVENTION

1. Field of this Invention

This invention relates to a process for producing implantable, porous, ceramic, bone substitution, bone connection or prosthesis anchoring materials. This invention also relates to both permanent and temporary replacement of bone matter, the choice of the ceramic starting materials depending on whether the material to be implanted remains in the tissue or whether it is there decomposed.

2. Prior Art

It is known that the formation of regular bone tissue in the pores of an implanted material can only be completely effective if the diameter of the pores does not fall below a specific minimum value. This minimum pore size is indicated by Hulbert et al., for example, as being approximately 150$\mu$m (Hulbert, S.: Investigation of the Potential of Ceramics for Surgical Applications. In: Biomaterials, Editor: A. L. Bement Jr., Published for Battelle Seattle Research Center by the University of Washington Press, Seattle and London, 1971). Furthermore, growth will only take place naturally in open pores. The minimum diameter indicated above also applies to the inside width of the pore inter-connections. Excessively large pores should be avoided for mechanical reasons.

According to known processes, implantable, porous, ceramic, materials are produced by foaming or firing out specific auxiliary agents which were mixed with the raw material. However, such known processes have the disadvantage that only irregular porosity can be obtained by the end product. The pores are either not open, that is, they are closed in on themselves, or the connection or passageway from pore to pore is insufficiently large. In addition, the size, shape, and distribution of the pores is irregular. Owing to this irregularity in porosity, bone tissue growth in the implant is either considerably hindered or even prevented. Dead areas can be produced on the periphery of the implanted material owing to closed or excessively small pores and pore passages. In these dead areas, there is either no growth or no regular bone formation. As a result, further living bone tissue is also prevented from penetrating into the inner part of the implant. The mechanical load which can be placed on the bone implant area or joint, which depends inter alia on the extent of new bone tissue growth in the substitute material, is also considerably reduced as a result of irregular porosity.

Attention is drawn to U.S. Patent Nos. 3,030,951 and 3,223,083.

BROAD DESCRIPTION OF THIS INVENTION

An object of this invention is, therefore, to produce an implantable, ceramic materials having open pores of regular size, distribution and disposition. The size and number of the pores should be freely selectable, so as to be able to obtain the ideal porosity for the particular application in point.

It has been shown that this task can be fulfilled, broadly, by a process consisting in producing a framework having pores and pore connections corresponding approximately to those of the finished product, in filling this structure with a pourable ceramic substance and subsequently in decomposing and removing the framework after the ceramic substance has at least partially hardened.

This invention involves a process for producing an implantable, porous, ceramic bone substitution or bone connection or prosthesis anchoring material and the like, which has open pores of substantially regular or uniform size, distribution and disposition. The process includes (a) producing a frame which corresponds approximately to the pores and pore connections of the desired finished product, (b) filling the frame with a physiologically suitable and biologically compatible castable or pourable ceramic mass, and (c) after at least a partial hardening of the ceramic mass, dismantling or decomposing and removing the frame, whereby said desired finished raw product or said ceramic material is obtained.

According to an advantageous embodiment of this invention, a solvent is carefully poured over a dense pile of spherical or cylindrical bodies, which are to be of approximately uniform size. (The solvent is one which gently or slowly dissolves part of the bodies.) After a short time the liquid is removed, leaving a film of liquid on the bodies. This liquid forms a meniscus at the points of contact or contact edges of the bodies. As a result, there is a movement of material between the individual bodies during the dissolving stage. This leads to the formation of bridges of material between the individual bodies. After complete evaporation of the solvent, adhesion surfaces areas remain. The size of these adhesive surfaces is influenced by the type of solvent, the time the bodies spend in the solvent and other variable parameters.

A further advantageous embodiment of this invention consists in that insoluble filler bodies having a low fusion point are used to produce the framework. These are moistened with an adhesive of low viscosity and are glued at the points of contact or the contact surfaces. However, it is also possible to use filler bodies having a low fusion point which can be sintered at the contact points or contact surfaces by an increase in temperature to values just below their fusion point (the contacting surfaces thereby forming bodies).

According to this invention, the material constituting the frame can be salts which are soluble or have a low fusion point, plastics, wax-type substances, metals or metal alloys. Substances which can be evaporated or burned at temperatures substantially below the sintering temperature of the ceramic mass are also advantageously used for the material constituting the framework.

According to this invention, the ceramic mass consists, for example, of a liquid-solid suspension of finely dispersed, claybonded ceramic materials, oxide-ceramic materials, glass-ceramic or vitreous materials in combination with suitable organic binding agent or cement-type materials (i.e., materials which harden and bind in the manner of cement).

The type of final setting operation of the porous material depends on the starting material. It can be effected by a ceramic firing or sintering process, or, in the case of the cement compounds, by a hydration process.

As physiologically suitable ceramic materials, oxides, mixed oxides and phosphates of Si, Mg, Al, Zr, titanium and others are particularly useful. Biologically compatible phosphates of Ca and Al of specific composition can be decomposed in a biological environment, whereas oxides are generally resistant.

The organic and inorganic additives fulfill the following multiple functions (when the castable ceramic mass is a liquidsolid suspension:
a. They impart to the molded bodies a certain "raw strength" after removal of the water.
b. At the beginning of the ceramic firing, they impart to the molded bodies an intermediate strength up to the beginning of the ceramic binding.
c. They lower the viscosity of the suspension and thus increase the solid portion of the suspensions.
d. They impart to the suspension thixotropic characteristics, that is to say the pouring slips or casting slips can be liquefied reversibly by mechanical interaction, for example, vibration.
e. They activate the burning and sintering characteristics during the final solidification of the raw materials.

Foreign body reactions of the bone tissue with respect to the implanted material can be reduced by providing in the pores of the materials, medicamentous organic materials which are also designed to stimulate new bone growth.

The manner of final solidification of the porous raw material depends on the starting material. It can be accomplished by means of a calcining or sintering process or, in the case of cement-like compounds, by means of a hydratization process.

This invention also includes the implantable porous, ceramic bone substitution or bone connection or prosthesis material, or the like, produced by the process of this invention.

This invention further includes the use of the implantable porous, ceramic bone substitution or bone connection- or prosthesis material of this invention for the permanent or temporary replacement of bone matter.

DETAILED DESCRIPTION OF THIS INVENTION

Careful research on the formation of material bridges between the polystryene bodies (pellets) by means of acetone has produced a further action sequence - in addition to the solution processes already described - this action sequence is important to the comprehension of the accurate adjustability of the width of the pore passages and of the burning-out process:

Acetone diffuses into the surface regions of the polystyrene pellets and reacts therewith through gel formation. As a result, the pellets then begin to swell and the initial punctiform contact with the adjacent pellets changes into areal contact. If the acetone is replaced by water, the swelling process is brought momentarily to a standstill and the swelling layers are "frozen" in this state, that is, the swelling state is retained unchanged.

This phenomenon has the following advantages as far as the further processing of the porous ceramic material is concerned:
- the size of the contact surfaces from pellet to pellet may be accurately regulated by means of definite reaction times owing to the relatively slow swelling process,
- when the desired swelling state is obtained, it can be arrested by the action of water without any undesirable after-swelling,
- the polystyrene gel layer contracts during the burningout of the support frame by means of acetone evaporation (vaporization) in the critical lower temperature range. The thermal expansion of the bodies (pellets) is compensated by this contraction and by the partial depolymerization of the polystyrene, thereby preventing the bursting of the crude ceramic mass into the filler chambers (spaces). In practice, this advantage is particularly important.

Other features, advantages and application will be made apparent in the following description of the most preferred embodiment of this invention which relates to the production of a selected porous $Al_2O_3$ body.

EXAMPLE

Essentially fine-grained $Al_2O_3$ powder (Type XA 16 from Alcoa) was used as the starting substance for producing the $Al_2O_3$ casting mass. The chemical composition of this mass was:

| | |
|---|---|
| $Al_2O_3$ | 95.3 % by weight |
| $Fe_2O_3$ | 0.01 % by weight |
| $Na_2$ | 0.08 % by weight |
| CaO | 2.60 % by weight |
| MgO | 0.05 % by weight |
| $SiO_2$ | 1.91 % by weight |

The secondary chemical constituents indicated (that is, the constituents present in small quantities) are derived from additives of bonding clay (kaolin), calc-spar and an inorganic diluent. These additives serve to improve the casting (pouring) and sintering properties of the $Al_2O_3$ mass. 0.4 percent polyvinyl-alcohol is also added to this mass as a temporary binder. A castable (pourable) slip having a solid matter content of approximately 80 percent was obtained. Polystyrene particles were used to produce the intermediate framework corresponding in its arrangement to the later shape and distribution of the pores. These particles had an almost theoretical spherical shape, but varied in diameter between approximately 0.2 and 2.0 mm. To obtain a uniform selection of particles, more precise screening fractions were produced, these being:

| | | |
|---|---|---|
| 0.2 | to | 0.4 mm |
| 0.4 | to | 0.6 mm |
| 0.6 | to | 0.8 mm |
| 0.8 | to | 1.0 mm |
| | | > 1.0 mm |

These screening fractions were shaken to form compact piles of particles in a hollow cylinder closed on one side by a sieve bottom; the column of particles poured into the cylinder were compressed by a cylindrical metal body placed thereupon. The mold prepared in this way was then introduced into a vessel containing acetone and left there for a certain time. (Acetone has a dissolving effect on polystyrene.) After removing the mold from the solvent mixture, the excess acetone was removed from the pile of particles by means of compressed air so that only a thin film of solvent remained on the particles. Contact meniscuses consisting of a solution saturated with polystyrene formed at the points of contact of the particles. Upon evaporation of the solvent, these meniscuses brought about a bonding (cementing) together of the particles at their contact surfaces. The size of these contact surfaces, which later form the pore passages in the porous material can be varied by varying the length of time the pile of particles remain in the solvent. With the dissolving conditions employed, pore passages between 0.18 and 0.22 mm were obtained. The framework produced in this way was saturated with the above-mentioned $Al_2O_3$ slop (suspension), from which the water was removed by means of subsequent drying. After being removed from the mold and partial setting of the suspension, the polystyrene framework was partially depolymerized by careful heating and was subsequently disintegrated. On terminating this process, the blank was heated to 1,600°C. and sintered for 2 hours at this temperature. Cylindrical bodies made of this material had a diameter of about 4 mm and a length of 12 to 15 mm and, owing to a 20 percent shrinkage in firing, they had pore diameters between 0.4 and 0.6 mm and pore passages of 0.12 and 0.18 mm. The cylindrical bodies were diametrically implanted into the tibia of test dogs. The tests were histologically examined 50 and 100 days after the operation. It was found that the tissue tolerance of this material was good and that regular bone tissue has formed in the pores.

What is claimed is:

1. The process for producing an implantable, porous, cermaic bone substitution- or bone connection - or prosthesis anchoring material, and the like, which has open pores of substantially regular or uniform size, distribution and disposition which comprises: (a) producing a frame which corresponds approximately to the pores and pore interconnections of the desired finished product, the frame being formed by preparing a compact arrangement of spherical bodies, which are approximately of equal or uniform size, filling said compact arrangement of spherical bodies with a liquid which gradually, gently dissolves said bodies, said liquid gradually, gently dissolving part of said filler bodies, the time of dissolving being sufficient to dissolve enough of said filler bodies so that bridges of the dissolved portion of said filler bodies can form bridges after said liquid is removed, and removing said liquid so that a liquid film remains on said bodies, said film constituting a liquid medium meniscus at the points or edges of contact of said bodies, whereby bridges of said dissolved portion said filler bodies form between said filler bodies; (b) filling the frame with a physiologically suitable and biologically compatible castable or pourable ceramic mass; and (c), after at least a partial hardening of the ceramic mass, dismantling or decomposing and removing the frame, whereby said desired finished product or said ceramic material is obtained.

2. The process according to claim 1 wherein substantially all of said filler bodies, said resultant open pores and said pore interconnections have a diameter of at least 150 μm.

3. A process according to claim 2 wherein the frame material is a soluble or low melting salt, plastic, wax-like substance, metal or metal alloy, each of which has a low fusion point or is soluble.

4. The process according to claim 2 wherein the frame material is a substance which can be evaporated or burned at a temperature which is considerably below the sintering temperature of the ceramic mass.

5. The process according to claim 2 wherein the castable ceramic mass is a liquid-solid suspension of a material selected from the group consisting of a clay-bonded material, a ceramic material, an oxide-ceramic material, a glass-ceramic material or a vitreous material, and a suitable binder or cement-type additive.

6. The process according to claim 2 hwerein the castable ceramic mass contains $Al_2O_3$.

7. The process according to claim 2 wherein the frame is prepared from polystyrene, in particle form.

8. The process for producing an implantable, porous, ceramic bone substitution- or bone connection - or prosthesis anchoring material, and the like, which has open pores of substantially regular or uniform size, distribution and disposition which comprises: (a) producing a frame which corresponds approximately to the pores and pore interconnections of the desired finished product, the frame being formed by wettening or moistening spherical, approximately equally or uniformly sized filler bodies with an adhesive having a low viscosity, said filler bodies being low melting and having a melting point lower than said ceramic material, and bringing said filler bodies together in a compact arrangement, said filler bodies being glued or cemented together by the adhesive at the points or surfaces of contact of said filler bodies; (b) filling the frame with a physiologically suitable and biologically compatible castable or pourable ceramic mass; and (c) after at least a partial hardening of the ceramic mass, dismantling or decomposing and removing the frame, whereby said desired finished product or said ceramic material is obtained.

9. The process according to claim 8 wherein substantially all of said filler bodies, said resultant open pores and said pore interconnections have a diameter of at least 150 μm.

10. The process according to claim 9 wherein the frame material is a soluble or low melting salt, plastic, wax like, substance, metal or metal alloy, each of which has a low fusion point or is soluble.

11. The process according to claim 9 wherein the frame material is a substance which can be evaporated or burned at a temperature which is considerably below the sintering temperature of the ceramic mass.

12. The process according to claim 9 wherein the castable ceramic mass is a liquid-solid suspension of a material selected from the group consisting of a clay-bonded material, a ceramic material, an oxide-ceramic material, a glass-ceramic material or a vitreous material, and a suitable binder or cement-type additive.

13. The process according to claim 9 wherein the castable ceramic mass contains $Al_2O_3$.

14. The process according to claim 9 wherein the frame is prepared from polystyrene, in particle form.

15. The process for producing an implantable, porous, ceramic bone substitution- or bone connection - or prosthesis anchoring material, and the like, which has open pores of substantially regular or uniform size, distribution and disposition which comprises: (a) producing a frame which corresponds approximately to the pores and pore interconnections of the desired finished products, the frame being formed by preparing a compact arrangement of spherical, approximately equally or uniformly sized filler bodies, said filler bodies, being low melting and having a melting point lower than said ceramic material and sintering together said low-melting filler bodies at the points or surfaces of contact of said filler bodies by an increase in the temperature of said filler bodies to a temperature just below the melting point of said filler bodies; (b) filling the frame with a physiologically suitable and biologically compatible castable or pourable ceramic mass; and (c) after at least a partial hardening of the ceramic mass, dismantling or decomposing and removing the frame, whereby said desired finished product or said ceramic material is obtained.

16. The process according to claim 15 wherein substantially all of the said filler bodies, said resultant open pores and said pore interconnections have a diameter of at least 150 μm.

17. The process according to claim 16 wherein the frame material is a soluble or low melting salt, plastic, wax-like substance, metal or metal alloy, each of which has a low fusion point or is soluble.

18. The process according to claim 16 wherein the frame material is a substance which can be evaporated or burned at a temperature which is considerably below the sintering temperature of the ceramic mass.

19. The process according to claim 16 wherein the castable ceramic mass is a liquid-solid suspension of a material selected from the group consisting of a clay-bonded material, a ceramic material, an oxide-ceramic material, a glass-ceramic material or a vitreous material, and a suitable binder or cement-type additive.

20. The process according to claim 16 wherein the castable ceramic mass contains $Al_2O_3$.

21. The process according to claim 16 wherein the frame is prepared from polystyrene, in particle form.

* * * * *